United States Patent [19]

Fuchs et al.

[11] Patent Number: 4,645,215
[45] Date of Patent: Feb. 24, 1987

[54] SHAFT AND RADIALLY SEALING RING WITH COLD FLEXED SEAL DISK AND A METHOD OF ITS USE FOR SEALING THE CRANKSHAFT OF A TWO-CYCLE ENGINE

[75] Inventors: Dieter Fuchs, Riedstadt; Wolfgang Schmitt, Viernheim, both of Fed. Rep. of Germany

[73] Assignee: Firma Carl Freudenberg, Weinheim/Bergstr, Fed. Rep. of Germany

[21] Appl. No.: 775,470

[22] Filed: Sep. 12, 1985

[30] Foreign Application Priority Data

Jan. 15, 1985 [DE] Fed. Rep. of Germany ....... 3501066

[51] Int. Cl.⁴ .............................................. F16J 15/32
[52] U.S. Cl. ......................................... 277/152; 277/9
[58] Field of Search .................. 277/25, 152, 153, 134, 277/1, 9

[56] References Cited

U.S. PATENT DOCUMENTS

| | | | |
|---|---|---|---|
| 3,275,331 | 9/1966 | Mastrobattista et al. | 277/152 X |
| 3,511,512 | 5/1970 | Wheelock | 277/153 X |
| 3,857,156 | 12/1974 | Clark | 277/134 X |
| 4,194,748 | 3/1980 | Forch et al. | 277/134 X |
| 4,283,064 | 8/1981 | Staab et al. | 277/134 X |
| 4,350,351 | 9/1982 | Martin | 277/153 X |
| 4,451,050 | 5/1984 | Repella | 277/134 |
| 4,497,496 | 2/1985 | Repella | 277/134 |
| 4,522,411 | 6/1985 | Burgan | 277/153 X |

FOREIGN PATENT DOCUMENTS

| | | | |
|---|---|---|---|
| 845584 | 8/1952 | Fed. Rep. of Germany | 277/152 |
| 2229682 | 1/1974 | Fed. Rep. of Germany | 277/152 |
| 2553290 | 8/1976 | Fed. Rep. of Germany | . |
| 2801711 | 9/1978 | Fed. Rep. of Germany | 277/153 |
| 56-156553 | 12/1981 | Japan | 277/152 |
| 398219 | 2/1966 | Switzerland | 277/152 |

*Primary Examiner*—Robert S. Ward
*Attorney, Agent, or Firm*—Felfe & Lynch

[57] ABSTRACT

A radially-sealing ring has a sealing element of a non-elastomeric plastic, preferably of PTFE, planar, annular disk having plane-parallel surfaces held at its outer circumference in a stiffening ring and cold flexed in the axial direction to form a cuff at its inner circumference which engages the shaft with bias. The disk has a thickness of from 0.3 to 0.8 mm and an inside diameter approximately 1.5 to 7 times its thickness less than the diameter of the shaft. The distance between the shaft and the line about stiffening ring where the disk is held is 2 to 7 times as great as the thickness of the disk. The radially-sealing ring is preferably for sealing the crankshaft of a two-cycle engine.

20 Claims, 2 Drawing Figures

SHAFT AND RADIALLY SEALING RING WITH COLD FLEXED SEAL DISK AND A METHOD OF ITS USE FOR SEALING THE CRANKSHAFT OF A TWO-CYCLE ENGINE

BACKGROUND OF THE INVENTION

The invention relates to a shaft and sealing ring, the sealing ring having, more particularly, a cold flexed seal disk, and a method of its use for sealing the crankshaft of a two-cycle engine.

A known seal ring is produced from an annular disk of a non-elastomeric plastic, preferably polytetrafluoroethylene (PTFE). The outer circumference of the disk is in a stiffening ring and the inner circumference of the disk is rolled in the axial direction so as to form a kind of cuff which engages the shaft under bias.

German Federal patent publication OS No. 25 53 290 describes a sealing ring of the above-described kind. It has a seal element produced from a ribbed but otherwise planar, annular disk. The seal element is rolled at its inner circumference toward the sealed chamber to form a cuff-like end section with its ribs contacting the shaft for pumping any leakage thereat back to the sealed space. The attainment of good sealing action depends, for this reason, on the shaft's turning at the correct speed.

If the circumferential speed of the shaft is too great, intensified pumping action of the ribs toward the sealed space results. This can cause lubrication failure around the dynamic sealing zone of the ribs, as well as the pumping of dust from the surroundings into the dynamic sealing zone and even into the sealed chamber. All of these events are undesirable and can result in the premature failure of the seal.

If the circumferential speed of the shaft is too little, decreased pumping action of the ribs toward the sealed space results. Below a certain threshold velocity, therefore, the dynamic sealing zone can shift toward the outside, epsecially at the interstices between individual ribs, to allow leakage or contamination. Particularly when the shaft is at rest or vacuum builds up in the sealed space, these effects are plain to see. Both are undesirable.

It is not possible, therefore, to use such a seal for sealing the crankshaft of a two-cyle engine in its crankcase, because vacuum is produced in its crankcase. The outside air and the contaminants it contains then easily pass through the dynamic sealing zone of the seal into the "sealed" crankcase. The presence of the ribs intensifies this problem.

SUMMARY OF THE INVENTION

An object of the invention is, therefore, improving a seal of the kind described above such that the described disadvantages are prevented. The resulting seal should provide good sealing action regardless of whether the sealed shaft is at rest or in rotation, even when the direction of the pressure differential across the seal changes, thus to be very well suited for sealing the crankshaft of a two-cycle engine.

For this, the invention proposes a seal having a planar, annular, non-elastomeric plastic, sealing-element disk the inside of which is cold flexed about a shaft. The disk has a thickness of from 0.3 to 0.8 mm and an inside diameter that is from about 1.5 to about 7 times the thickness of the disk less than the diameter of the shaft. The distance of a line of innermost sealing attachment of a stiffening ring about the outside of the disk from the surface of the shaft is 2 to 7 times the thickness of the disk. Preferably, a disk of a thickness of 0.4 to 0.6 mm has an inside diameter that is from about 3 to about 4 times its thickness less than the diameter of the shaft, the distance from the shaft of the innermost sealing-attachment line of the disk to the stiffening ring then being 3 to 4 times the thickness of the disk.

The disk sealing element of the invention is substantially smaller and more compact than the embodiment in accordance with the state of the art described above, yet it is entirely adequate in relation to the radial displacements of the shaft which occur in normal machine construction. In particular, shafts having a diameter of from 10 to 40 mm can be sealed in an excellent manner by using the seal according to the invention.

The axial length of the dynamic sealing zone, where the disk is flexed about the shaft, is thus extraordinarily short. This increases assurance of necessary lubrication in this critical zone by the medium being sealed. Also of great importance in this regard is the use of non-elastomeric plastic, especially polytetrafluoroethylene (PTFE), for the production of the disk sealing element.

Before the disk is installed, its inner margin can be rolled in the axial direction to form a cuff, for example by using a shaping tool. However, it is of decisive importance to avoid any heating of the disk material in this forming process, so as not to impair the shape-recovering tendency of the material that is used. As a result, the cuff of the disk is uniformly urged against the surface of the shaft as a dynamic sealing zone over long periods of time. This suffers no impairment during normal operation because the dynamic sealing zone is so extraordinarily short and, thus, well lubricated as to forestall any excessive heating.

The disk has no hydrodynamically-acting back-pumping elements facing the shaft at its axially-turned end section or cuff. Its sealing effect is, thus, completely assured regardless of whether the shaft is at rest or rotating. Even changing directions or spaced shaft of rotation and alternating directions of pressure differential axially across the disk produce no adverse effect. When the disk is used as a crankshaft seal in a two-cycle engine, however, it has been found preferable to install it such that the inside margin of the disk is rolled, i.e., cold flexed, to extend in a direction away from the sealed chamber, i.e. the crankcase. This suits the seal above all for sealing the crankshaft of any two-cycle engine in its crankcase.

In a preferred embodiment, the outside portion of the disk sealingly attached to the stiffening ring is approximately at a right angle to the shaft. Other orientations are easily possible, but the right-angled relationship achieves an especially-long useful life and good sealing results.

The stiffening ring can have an annular projection on the side thereof opposite that toward which the disk is cold flexed to extend to the cuff. The annular projection can reach to the immediate vicinity of the shaft. This improves the axial support of the disk and, thereby, its cuff for producing the dynamic sealing action and makes the dynamically-sealing cuff less accessible to exterior dirt and dust. If the ring is installed so that the disk extends away from the sealed chamber, as preferred in sealing the crankshaft in the crankcase of a two-cycle engine, for example, this also improves the sealing action. This, latter result, might be due, in the exemplary case, to the fact that the pressure pulsations produced in operation of a two-cycle engine are substantially blocked from the dynamic sealing zone by the annular projection of the stiffening ring. Optimum results are achieved when the annular projection of the stiffening ring is brought very close to the shaft. The annular projection is best defined on its inside by a cylindrical surface having an axial length at least as great as its distance from the shaft, and preferably, at least 3 and no more than 10 times as great.

To reduce manufacturing costs, it has proven advantageous for the stiffening ring to be made of plastic injection-molded onto the outer margin of the disk. Thermosetting materials are preferred. Problems regarding the fastening and sealing together of the two parts can thus be reliably prevented, especially if the method of doing this is the one described in German Federal Patent publication No. 3 329 386.

DETAILED DESCRIPTION OF THE ILLUSTRATED EMBODIMENT

Figure 1:
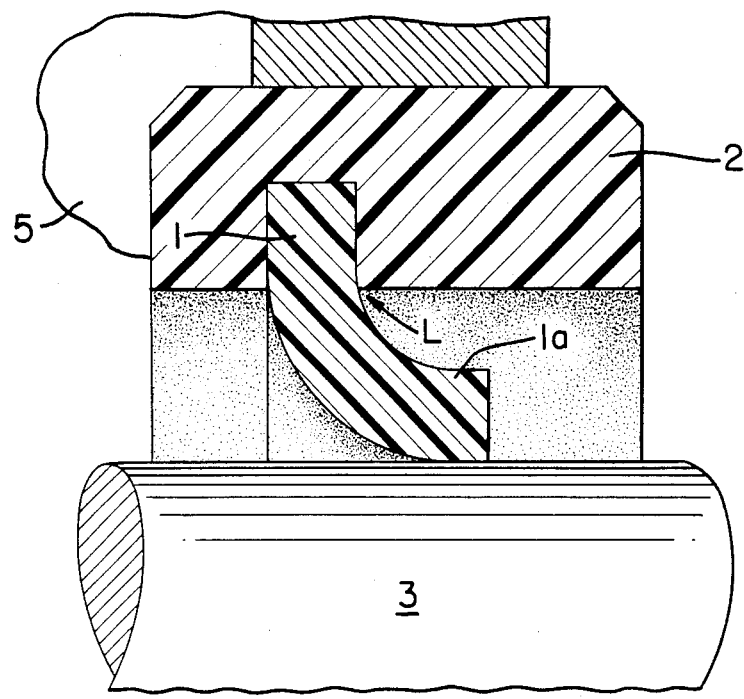
FIG. 1 is half an axial elevation of one embodiment, partly in cross section, together with a portion of a crankcase of a two-cycle engine, also partly in cross section, for a method in which the embodiment may be used.

The seal embodiment illusrated in FIG. 1 is for sealing a crankshaft 3 of a two-cycle engine where it projects through a crankcase 5 of the engine (shown only by its crankcase 5). It consists of a stiffening ring 2 and disk 1. The stiffening ring 2 is made from glass fiber-reinforced phenolic resin that has been formed, i.e. sealingly attached, directly onto the outer margin of the disk 1 at an innermost line at L where the disk 1 forms a right angle with the crankshaft 3. This can be done at low manufacturing cost. The disk 1 is annular and made of PTFE. It was planar before being cold flexed or rolled to extend away from the sealed chamber of the crankcase 5 to a cuff 1a engaging the surface of the thus-sealed shaft 3.

For sealing a shaft 3 of 20 mm diameter, the disk 1 has an outside diameter of 27 mm, an inside diameter before cold flexing of 18.2 mm, and a thickness of 0.5 mm. The axial length of cuff contact with the shaft surface resulting after installation as shown in FIG. 1 amounts to approximately 0.3 mm and is, thus, extremely short. The seal is, therefore, easy to install.

Figure 2:
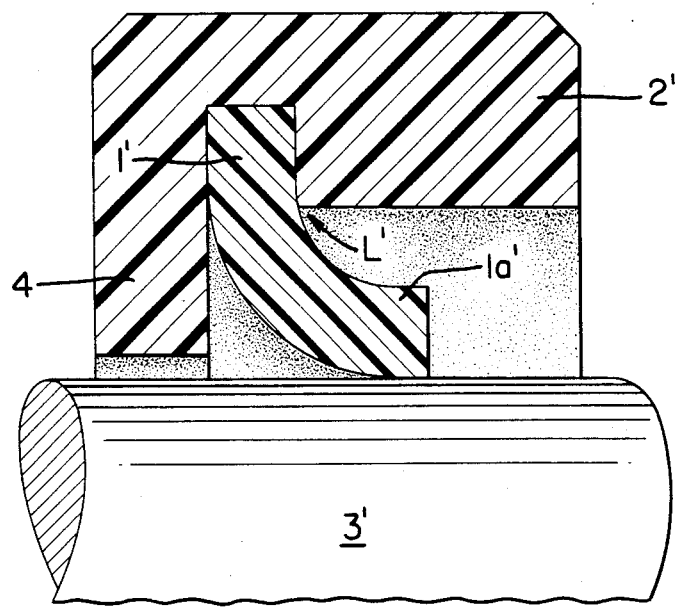
FIG. 2 is half an axial elevation of another embodiment, partly in cross section.

The seal shown in FIG. 2 is substantially the same as that shown in FIG. 1. Corresponding components which are identified in correspondence with FIG. 1 will not be, therefore, re-described.

The seal shown in FIG. 2 differs from that of FIG. 1 in an annular porjection 4 from the stiffening ring 2' toward the shaft 3' on the side the disk 1' opposite that toward which the disk is cold flexed to extend to cuff 1a'. When the shaft 3' is on the crankshaft of a two-cycle engine (not shown in FIG. 2, 5 in FIG. 1) the projection 4 gives the seal excellent sealing action through its entire life.

We claim:

1. A shaft and seal ring combination made by the process comprising:

providing the shaft;
cold flexing the inside of an annular, planar disk of non-elastomeric plastic about the shaft, the disk having a thickness of from 0.3 to 0.8 mm and, before being cold flexed about the shaft, an inside diameter of from about 1.5 to about 7 times the thickness of the disk less than the diameter of the shaft; and
sealingly attaching a stiffening ring about the outside of the disk, the line of the innermost sealing attachment between the stiffening ring and the disk being from 2 to 7 times the thickness of the disk from the surface of the shaft.

2. The shaft and seal ring combination of claim 1, wherein the thickness of the disk is from 0.4 to about 0.6 mm, the inside diameter of the disk is from 3 to about 4 times the thickness of the disk less than the diameter of the shaft, and the line of the innermost attachment between the stiffening ring and the disk is from 3 to 4 times the thickness of the disk from the surface of the shaft.

3. The shaft and seal ring combination of claim 1, wherein the portion of the disk sealingly attached to the stiffening ring is approximately at a right angle to the shaft.

4. The shaft and seal ring combination of claim 2, wherein the portion of the disk sealingly attached to the stiffening ring is approximately at a right angle to the shaft.

5. The shaft and seal ring combination of claim 1, and further comprising providing an inward, annular projection from the stiffening ring on the side thereof opposite that toward which the disk is cold flexed for axially supporting the disk.

6. The shaft and seal ring combination of claim 2, and further comprising providing an inward, annular projection from the stiffening ring on the side thereof opposite that toward which the disk is cold flexed for axially supporting the disk.

7. The shaft and seal ring combination of claim 3, and further comprising providing an inward, annular projection from the stiffening ring on the side thereof opposite that toward which the disk is cold flexed for axially supporting the disk.

8. The shaft and seal ring combination of claim 4, and further comprising providing an inward, annular projection from the stiffening ring on the side thereof opposite that toward which the disk is cold flexed for axially supporting the disk.

9. A method of sealing the crankcase of a two-cycle engine about the crankshaft thereof with a seal ring, comprising:

providing a two-cycle engine having a crankcase with a crankshaft therethrough;
cold flexing the inside of an annular, planar disk of polytetrafluoroethylene so that the innermost portion of one side thereof extends axially about the crankshaft, the disk having a thickness of form 0.3 to 0.8 mm and, before being cold flexed about the shaft, an inside diameter of from about 1.5 to about 7 times the thickness of the disk less than the diameter of the shaft; and
sealingly attaching a stiffening ring about the outside of the disk, the line of the innermost sealing attachment between the stiffening ring and the disk being from 2 to 7 times the thickness of the disk from the surface of the shaft.

10. The method of claim 9, wherein the thickness of the disk is from 0.4 to 0.6 mm, the inside diameter of the disk is from about 3 to about 4 times the thickness of the disk less than the diameter of the shaft, and the line of the innermost attachment between the stiffening ring and the disk is from 3 to 4 times the thickness of the disk from the surface of the shaft.

11. The method of claim 9, wherein cold flexing the disk comprises cold flexing the same away from the crankcase.

12. The method of claim 10, wherein cold flexiing the disk comprises cold flexing the same away from the crankcase.

13. The method of claim 9, wherein the portion of the disk sealingly attached to the stiffening ring is approximately at a right angle to the shaft.

14. The method of claim 10, wherein the portion of the disk sealingly attached to the stiffening ring is approximately at a right angle to the shaft.

15. The method of claim 11, wherein the portion of the disk sealingly attached to the stiffening ring is approximtely at a right angle to the shaft.

16. The method of claim 12, wherein the portion of the disk sealingly attached to the stiffening ring is approximately at a right angle to the shaft.

17. The method of claim 9, and further comprising providing an inward, annular projection from the stiffening ring on the side thereof opposite that toward which the disk is cold flexed for axially supporting the disk.

18. The method of claim 11, and further comprising providing an inward, annular projection from the stiffening ring on the side thereof opposite that toward which the disk is cold flexed for axially supporting the disk.

19. The method of claim 13, and further comprising providing an inward, annular projection from the stiffening ring on the side thereof opposite that toward which the disk is cold flexed for axially supporting the disk.

20. The method of claim 16, and further comprising providing an inward, annular projection from the stiffening ring on the side thereof opposite that toward which the disk is cold flexed for axially supporting the disk.

* * * * *